(12) United States Patent
Riemer (10) Patent No.: US 6,724,936 B1
(45) Date of Patent: Apr. 20, 2004

(54) HANDWRITING INPUT DEVICE AND METHOD USING A SINGLE CHARACTER SET

(75) Inventor: Itay Riemer, Givataim (IL)

(73) Assignee: ART-Advanced Recognition Technologies, Ltd., Tel Aviv (IL)

( * ) Notice: Subject to any disclaimer, the term of this patent is extended or adjusted under 35 U.S.C. 154(b) by 605 days.

(21) Appl. No.: 09/643,747

(22) Filed: Aug. 23, 2000

(51) Int. Cl.⁷ .................................................. G06K 9/68
(52) U.S. Cl. ..................... 382/186; 382/187; 382/217
(58) Field of Search ................. 382/187–189, 382/186, 209, 217, 218, 220

(56) References Cited

U.S. PATENT DOCUMENTS

| | | | |
|---|---|---|---|
| 4,531,231 A | | 7/1985 | Crane et al. |
| 5,333,209 A | * | 7/1994 | Sinden et al. ............... 382/187 |
| 5,675,665 A | * | 10/1997 | Lyon .......................... 382/229 |
| 5,680,527 A | * | 10/1997 | Sakaguchi .................. 345/627 |
| 5,774,582 A | | 6/1998 | Gat et al. |
| 5,889,888 A | | 3/1999 | Marianetti, II et al. |
| 5,903,667 A | | 5/1999 | Kuzunuki et al. |
| 5,917,942 A | * | 6/1999 | Ehsani et al. ............... 382/189 |
| 5,982,929 A | | 11/1999 | Ilan et al. |
| 5,991,440 A | * | 11/1999 | Matsubayashi et al. ..... 382/187 |
| 6,023,529 A | | 2/2000 | Ilan et al. |
| 6,055,333 A | | 4/2000 | Guzik et al. |
| 6,157,372 A | | 12/2000 | Blackburn et al. |

OTHER PUBLICATIONS

El–Sheikh et al. "Real–Time Arabic Handwritten Character Recognition." 3rd Int. Conf. on Image Processing and Its Applications, Jul. 18, 2989, pp.212–216.*
Wilfong et al. "On–Line Recognition of Handwritten Symbols." IEEE Trans. on Pattern Analysis and Machine Intelligence, vol. 18, No. 9, Sep. 1996, pp.935–940.*

* cited by examiner

*Primary Examiner*—Jon Chang
(74) *Attorney, Agent, or Firm*—Eitan, Pearl, Latzer & Cohen Zedek, LLP (57) ABSTRACT

A method for recognizing input characters handwritten onto an input area of an input device, each point of the input area being represented by coordinate values. The method includes the steps of receiving a signal representative of an input character, determining an input position representative of the input character using information about the coordinate values, and recognizing the input character as one of a plurality of reference characters in a reference library. The recognizing step at least uses recognition features and a weighting function of each of the plurality of reference characters in the reference library and the input position. The signal includes at least information about the coordinate values of the input character.

14 Claims, 8 Drawing Sheets

Fig. 1

CHARACTER "l"  CHARACTER "n"

50  52  54    56  58

CHARACTER "b"

HANDWRITING INPUT DEVICE AND METHOD USING A SINGLE CHARACTER SET

FIELD OF THE INVENTION

The present invention relates to input devices using handwriting recognition.

BACKGROUND OF THE INVENTION

Various methods for handwriting recognition (HWR) have been disclosed in the literature. Some of them categorize characters based on general databases containing all possible characters. The drawback of this approach is that the corresponding algorithms are very complicated and comparatively slow. This is because it is difficult to achieve good recognition accuracy using simple algorithms. Other methods, such as those disclosed in U.S. Pat. Nos. 4,531,231, 5,889,888, 5,903,667, 6,055,333, use a plurality of different input areas for inputting different character sets such as alphabetic and numeric characters. The different character sets are input into their respective input areas in order to simplify recognition algorithms and to increase recognition probability. The idea is that the algorithms for each input area can be limited to features of the corresponding character set. This approach, however, is not always feasible. There are devices, cellular phones, for example, where input areas are purposely made as small as possible, and it is impossible or inconvenient, to use a plurality of input areas.

SUMMARY OF THE INVENTION

There is provided, in accordance with a preferred embodiment of the present invention, a method for recognizing input characters handwritten onto an input area of an input device, each point of the input area being represented by coordinate values. The method includes the steps of receiving a signal representative of an input character, determining an input position representative of the input character using the information about the coordinate values, and recognizing the input character as one of a plurality of reference characters in a reference library. The recognizing step at least uses recognition features and a weighting function of each of the plurality of reference characters in the reference library and the input position. The signal includes at least information about the coordinate values of the input character.

Furthermore, in accordance with a preferred embodiment of the present invention, the input position is a center of gravity of the input character.

Additionally, in accordance with a preferred embodiment of the present invention, the coordinate values include a first coordinate value and a second coordinate value and the input position is at least one of a maximal value of the first coordinate value, a maximal value of the second coordinate value, a minimal value of the first coordinate value, and a minimal value of the second coordinate value.

Moreover, in accordance with a preferred embodiment of the present invention, the coordinate values include a first coordinate value and a second coordinate value and the weighting function is a linear function or a non-linear function of at least one of the first coordinate value and the second coordinate value.

Additionally, in accordance with a preferred embodiment of the present invention, the weighting function is a constant determined from a look-up table.

Moreover, in accordance with a preferred embodiment of the present invention, the plurality of reference characters represents a single character set.

Furthermore, in accordance with a preferred embodiment of the present invention, the reference library is a single library, Additionally, in accordance with a preferred embodiment of the present invention, the step of recognizing further includes the steps of extracting input recognition features of the input character, comparing between the input recognition features and the recognition features of the reference characters and generating a primary recognition probability vector, determining a position probability vector for the input character using the input position and the weighting function of each of the plurality of reference characters, determining a general recognition probability vector for the input character using the primary recognition probability vector and the position probability vector, and selecting a reference character having the highest general recognition probability vector as the recognized character.

There is also provided, in accordance with a preferred embodiment of the present invention, a method for distinguishing among handwritten characters. The method includes the steps of receiving information about an input character including at least one input position, having a library of reference characters, and recognizing the input character as one of the reference characters by at least using the input position and the reference position information. Each one of the reference characters has reference position information associated with it.

Moreover, in accordance with a preferred embodiment of the present invention, the at least one input position is a center of gravity of the input character.

Furthermore, in accordance with a preferred embodiment of the present invention, the at least one input position includes a first coordinate value and a second coordinate value.

Additionally, in accordance with a preferred embodiment of the present invention, the at least one input position is at least one of a maximal value of the first coordinate value, a maximal value of the second coordinate value, a minimal value of the first coordinate value, and a minimal value of the second coordinate value.

Moreover, in accordance with a preferred embodiment of the present invention, the reference position information is a linear or a non-linear function of at least one of the first coordinate value and the second coordinate value.

Additionally, in accordance with a preferred embodiment of the present invention, the reference position information is a constant determined from a look-up table.

Furthermore, in accordance with a preferred embodiment of the present invention, the library represents a single character set.

Moreover, in accordance with a preferred embodiment of the present invention, the library is a single library.

Still further, in accordance with a preferred embodiment of the present invention, the reference position information includes a probability function of position.

Moreover, in accordance with a preferred embodiment of the present invention, the step of recognizing includes the steps of extracting input features from the input character, generating a primary recognition probability using the input features and reference features of the reference characters, generating a position probability using the input position and the reference position information, generating a general probability for each of the reference characters using the primary recognition probability and the position probability, and selecting the reference character whose general probability is best according to a selection criteria.

There is provided, in accordance with a preferred embodiment of the present invention, a system for the recognition of input characters handwritten onto an input area of an input device, each point of the input area being represented by coordinate values. The system includes a unit for receiving a signal representative of an input character, a unit for determining an input position representative of the input character using the information about the coordinate values, and a handwriting recognition unit for recognizing the input character as one of a plurality of reference characters in a reference library. The handwriting recognition unit at least uses recognition features and a weighting function of each of the plurality of reference characters in the reference library and the input position. The signal includes at least information about the coordinate values of the input character.

Additionally, in accordance with a preferred embodiment of the present invention, the handwriting recognition unit includes a module for extracting input recognition features of the input character, a module for comparing between the input recognition features and the recognition features of the reference characters and generating a primary recognition probability vector, a module for determining a position probability vector for the input character using the input position and the weighting function of each of the plurality of reference characters, a module for determining a general recognition probability vector for the input character using the primary recognition probability vector and the position probability vector, and a module for selecting a reference character having the highest general recognition probability vector as the recognized character.

There is also provided, in accordance with a preferred embodiment of the present invention, a system for distinguishing among handwritten characters. The system includes a unit for receiving information about an input character the information including at least one input position, a library of reference characters, and a handwriting recognition unit for recognizing the input character as one of the reference characters by at least using the input position and the reference position information. Each one of the reference characters has at least reference position information associated therewith.

Moreover, in accordance with a preferred embodiment of the present invention, the handwriting recognition unit includes a unit for extracting input features from the input character, a unit for generating a primary recognition probability using the input features and reference features of the reference characters, a unit for generating a position probability using the input position and the reference position information, a unit for generating a general probability for each of the reference characters using the primary recognition probability and the position probability, and a unit for selecting the reference character whose general probability is best according to a selection criteria.

BRIEF DESCRIPTION OF THE DRAWINGS

The present invention will be understood and appreciated more fully from the following detailed description taken in conjunction with the drawings, in which.

DETAILED DESCRIPTION OF THE PRESENT INVENTION

Figure 1:
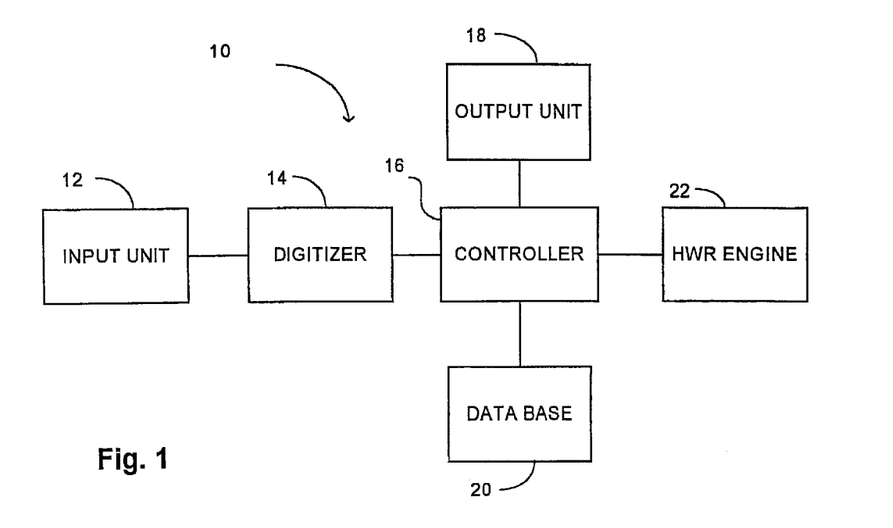
FIG. 1 is a block diagram illustration of an Input device for handwritten data, constructed and operative in accordance with a preferred embodiment of the present invention.

Reference is now made to FIG. 1, which is a block diagram illustration of a handwriting input device (HID), generally referenced 10, constructed and operative in accordance with a preferred embodiment of the present invention.

HID 10 comprises a handwriting-recognition unit 22, constructed and operative in accordance with a preferred embodiment of the present invention, which reduces the ambiguity resulting from the similarity of shapes by extracting the features of a character input to HID 10, and an input position, and comparing its features with the features of each of the characters represented in a single character set represented in a reference library.

HID 10 further comprises an input unit 12, a digitizer 14, a controller 16, an output unit 18, and a database unit 20 which contains the reference library. Digitizer 14 is connected to input unit 12 and to controller 16. Controller 16 is also connected to output unit 18, to database unit 20, and to handwriting recognition unit 22.

Input unit 12 can be any handwriting input unit known in the art. It includes a writing surface, which is preferably, though not necessarily, flat. To enter a character, a user simply writes this character on the writing surface using, for example, a stylus or a finger. The writing surface is responsive to the position of the stylus or finger on the writing surface.

Some types of input units may additionally be responsive to applied pressure or to changes of electrical resistance at points where the stylus is located. Generally, a plurality of output signals are generated wherein each signal may include data regarding different characteristics such as location coordinates, pressure, and time. The output signals of input unit 12 include information about coordinates of the character points. Hereinbelow, coordinates pairs x and y will be used in an exemplary fashion for descriptive purposes only to represent the coordinates. Depending on the type of input unit 12, the output signals can also include information about the relative value of applied pressure or electrical resistance at respective points, and the like.

Hereinbelow the word "character" refers to any input information that can be recognized, for example, alphabetic characters, numbers, editing gestures, and punctuation marks. In accordance with an embodiment of the present invention, a single character set, which includes a plurality of characters, is used for inputting and recognition. For example, a single character set is used for the entire alphanumeric character set. This is as opposed to using different character sets, for example, one for alphabetic characters and another for numbers.

Input unit 12 converts the characters being entered into analog signals, is which digitizer 14 converts into a set of digits representing different aspects of the analog signal. The digitized signal can include, for example, information about the x and y coordinates of the points to which the pressure was applied, the relative value of the pressure, and time counters related to the time taken to move between {x, y} points. Digitizer 14 provides the digital signal to controller 16. In an alternative embodiment of the present invention, input unit 12 and digitizer 14 may be combined in a single unit.

Controller 16 provides the digital signal (from digitizer 14) to handwriting-recognition (HWR) unit 22 for recognition. HWR unit 22, extracts the features of the input character and compares them with the features of characters represented in a reference library that Is stored in database unit 20. When the input character is recognized, HWR unit 22 provides an output signal, representative of the recognized character, to output unit 18, via controller 16.

Output unit 18 can be the display of a hand-held or regular computer, the display of a cellular telephone, a printer, and the like. Output unit 18 can share its display area with input unit 12.

Figure 2:
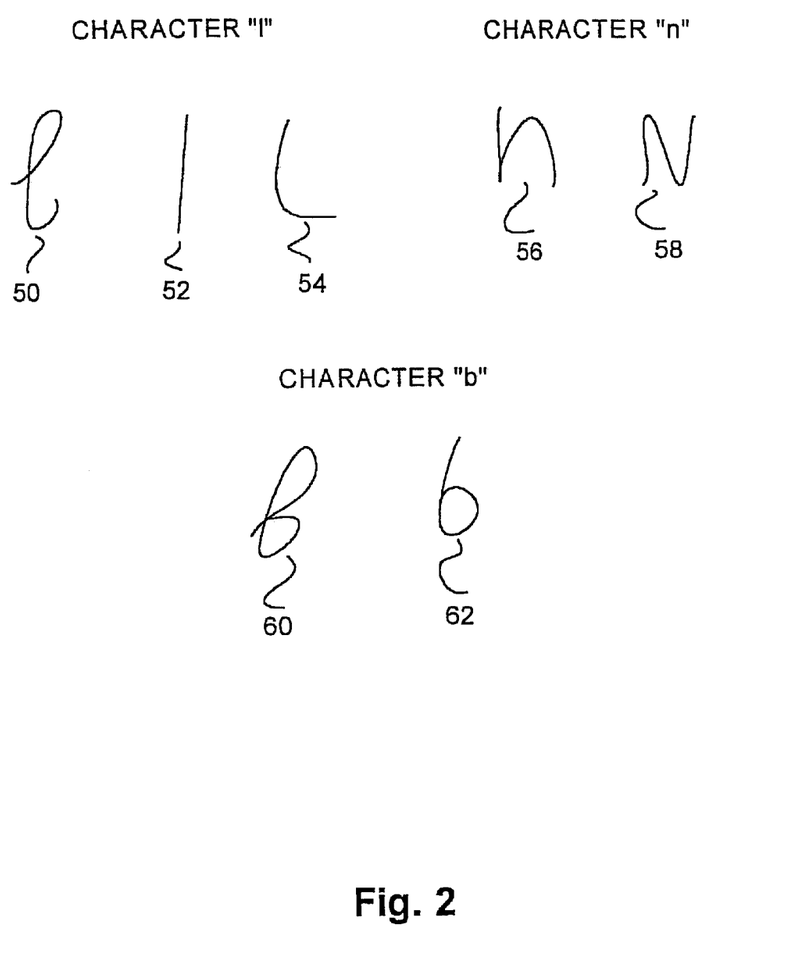
FIG. 2 is a schematic illustration of exemplary samples of handwritten characters "l", "n" and "b"

Since the shapes of the characters that are input differ significantly from user to user, each character being recognized, (herein referred to as the output character), corresponds generally to a plurality of the reference characters that are stored in database unit 20. Reference is now made to FIG. 2, a schematic illustration of exemplary specimens of the handwritten characters "l", "n", and "b". The output character "l" in this example corresponds to a set of three reference characters 50, 52, and 54, each depicting the letter "l" written in a different handwriting style. The output character "n" corresponds in this example to a set of two reference characters 56 and 58. Finally, the output character "b" corresponds to a set of two reference characters 60 and 62.

Figure 3:
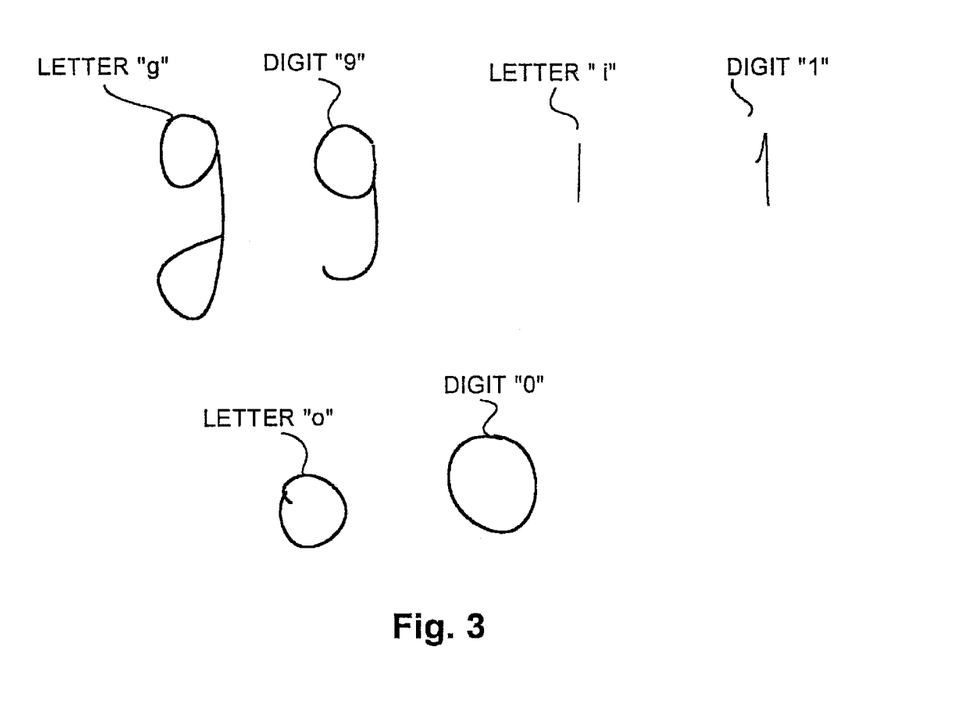
FIG. 3 is a schematic illustration of exemplary pairs of handwritten characters that are similar in appearance.

Different input characters may have very similar shapes, as illustrated in FIG. 3, to which reference is now made. Examples of input characters with similar shapes are shown. Similar pairs of characters are for example, the letter "o" and the digit "0", the letter "g" and the digit "9", and the letter "i" and the digit "1". Such characters can be grouped into "confusing groups", wherein each confusing group includes the characters whose "handwritten" shapes are similar. Thus, the letter "o" and the digit "0" would be in one exemplary confusing group and the letter "i" and the digit "1" would be in another.

The present invention reduces the ambiguity resulting from the similarity of shapes. Handwriting-recognition unit 22 assigns to each reference character a coordinate-dependent weighting function (CDWF). The CDWF is generally a function of coordinates x and y that vanes in the range from 0 to 1. The use of the CDWF enables distinguishing of characters with similar shapes depending on their positioning on the writing surface of input unit 12. Hereinbelow, the word "positioning" (of a character) means any feature which is location dependent and which can be calculated based on a set of the coordinates (for example, the x and y coordinates) of a character. Examples may include the center of gravity, the far-left, or the far-right point of a signal. Unambiguous characters, which are not included in any "confusing groups", can be characterized by a CDWF with a constant value and, hence, can be advantageously input everywhere in the writing surface.

It is noted that the CDWF(x, y) may be a product of two independent functions $CDWF_1(x)$ and $CDWF_2(y)$, that is:

$$CDWF(x,y)=CDWF_1(x)*CDWF_2(y). \tag{1}$$

In one embodiment of the present invention, the CDWF is a linear function of x alone, having the form:

$$CDWF(x)=a+b*x, \tag{2}$$

where a and b are constants that define the extent of the dependence of the weighting factor on x. In such a case, CDWF(y) is equal to a constant.

Figure 4:
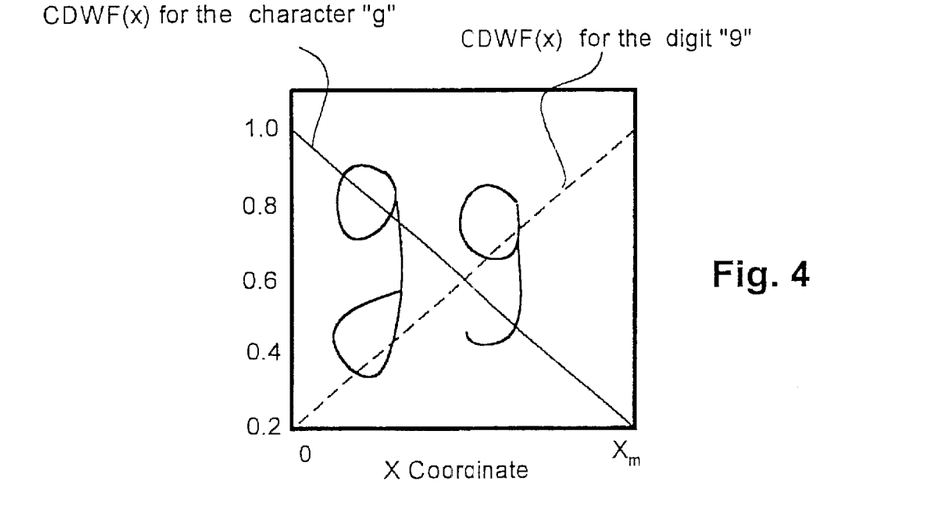
FIG. 4 is a schematic illustration of the character "g" and the digit "9" and their respective coordinate-dependent weighting factor (CDWF) functions.

Reference is now made to FIG. 4, an exemplary illustration of the CDWF(x) values for the character "g" and the digit "9". In this example:

$$CDWF_{``g"}(x)=1-0.8*x/X_m \tag{3}$$

whereas $$CDWF_{``9"}(x)=0.2+0.8*x/X_m \tag{4}$$

and $X_m$ is the value of x at the extreme right point of the writing surface, i.e. the size of the writing surface along the x direction.

To increase the probability of correct recognition, character "g" should be input generally in the left hand area of a writing surface while digit "9" should be input generally in the right hand area.

Figure 5:
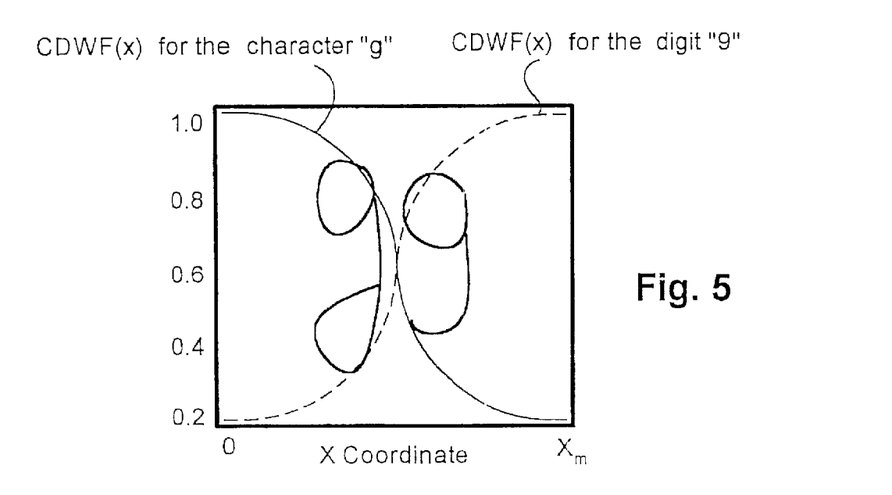
FIG. 5 is a schematic illustration of the character "g" and the digit "9" and their respective CDWF functions.

In another embodiment of the present invention, CDWF (x) is a non-linear function of x. FIG. 5, to which reference is now made, is an illustration of an exemplary CDWF(x) function with a non-linear dependence on x for the character "g" and the digit "9". Any non-linear function or a look-up table of x, y values may be used. This may be necessary especially in the case of a customized writing surface shape.

In a still further embodiment of the present invention there is employed a function CDWF(x,y) of the form:

$$CDWF(x,y)=CDWF_1(x)*CDWF_2(y), \tag{5}$$

where $CDWF_1(x)$ can be one of the functions mentioned hereinabove in equations (2)–(4) and FIG. 5, and where $CDWF_2(y)$ is a linear function of y that has the following form:

$$CDWF_2(y)=c+d*y, \tag{6}$$

where c and d are constants that define the dependence of the weighting factor $CDWF_2(y)$ on y.

Figure 6:
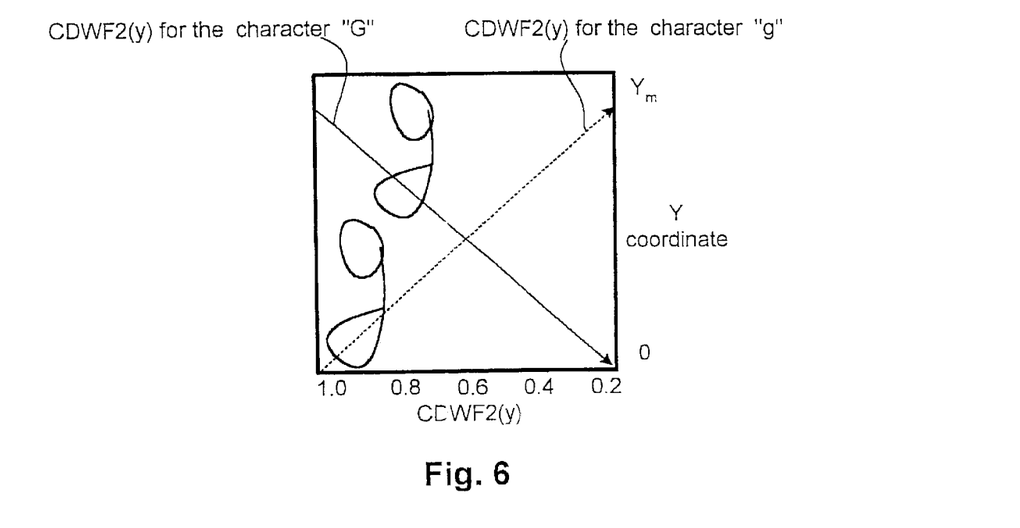
FIG. 6 is a schematic illustration of the characters "g" and "G" and their respective CDWF functions.

$CDWF_2(y)$ in an embodiment of the present invention may be used for distinguishing between regular and capital letters. Reference is now made to FIG. 6, a schematic illustration of $CDWF_2(y)$ for the characters "g" and "G". In this example:

$$CDWF_{2``g"}(Y)=1-0.8*y/Y_m \tag{7}$$

whereas $$CDWF_{2``G"}(Y)=0.2+0.8*y/Y_m \tag{8}$$

where $Y_m$ is the value of y at the uppermost point of the working surface, i.e. the size of the writing surface along the y direction.

If $CDWF_1(x)$ is defined by equation (3), and the user inputs the character "g" in the upper left hand portion of the writing area, it is recognized as the letter "G". Alternatively, if the same character "g" is input in the lower left-hand portion of the working area it is recognized as the letter "g", Thus, it is not necessary in this embodiment of the present invention to input capital letters.

Figure 7:
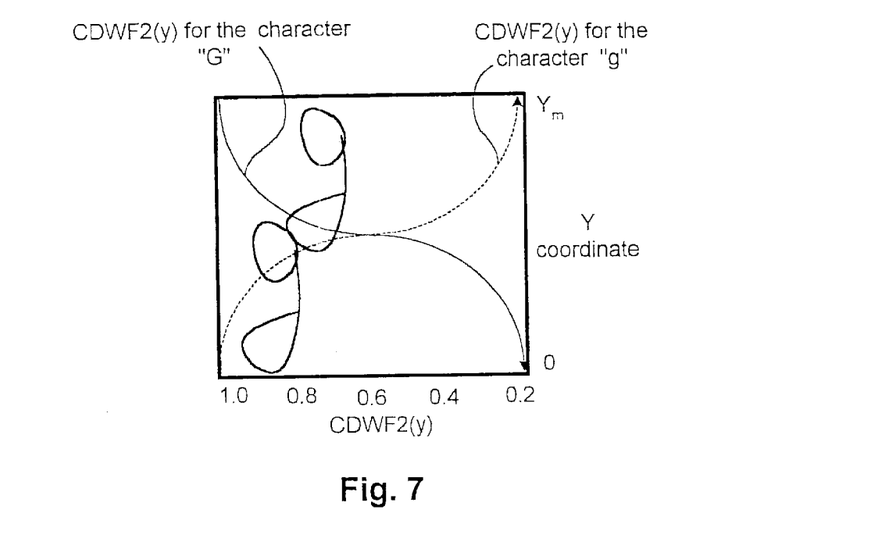
FIG. 7 is a schematic illustration of the characters "g" and "G" and their respective CDWF functions.

$CDWF_2(y)$ may also be defined by a non-linear function of y, as is illustrated in FIG. 7, to which reference is now made. As mentioned hereinabove with reference to FIG. 5, a look-up table of x, y values or a non-linear function may be used.

It should be appreciated that other types of appropriate functions CDWF(x, y) can be used to improve the recognition of the handwritten input characters and are included within the scope of this invention.

Use of CDWF(x, y) in the manner described hereinabove, allows differentiation, for example between the characters "g", "G", and "9".

Figure 8:
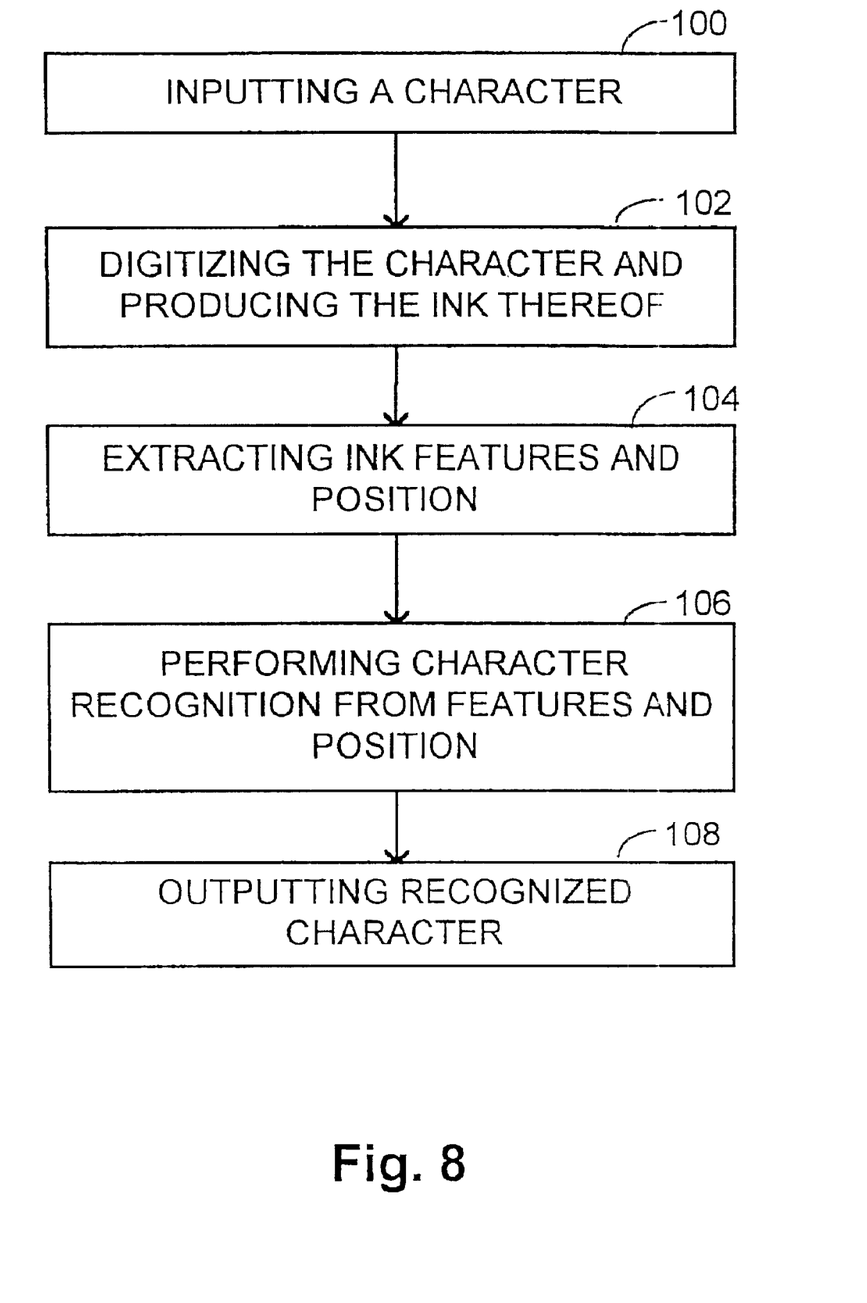
FIG. 8 is a schematic flowchart illustration of the steps for using the input device for handwritten data of FIG. 1.

Reference is now made to FIG. 8, which is a schematic flowchart illustration of the method for operating HID 10 of FIG. 1 in accordance with an embodiment of the present invention.

In step 100 a character is input. As mentioned hereinabove in FIG. 1, a user inputs a character selected from a predetermined character set using input unit 12. The user can utilize any conventional stylus or a finger to input the character. Input unit 12 provides an output signal to digitizer 14. The output signal comprises information about the coordinates (for example x and y coordinates) of the tip of the stylus (or finger) at its contact points with the writing surface, as a function of time. The output signal can also include additional information, such as the value of the pressure produced by the stylus (or finger) at various contact points and the like.

In step 102 the output signal is digitized and an ink is produced thereof. As mentioned hereinabove in FIG. 1, digitizer 14 digitizes the signal provided by input unit 12 and provides the resulting vector of binary numbers (known in the art as an ink) to controller 16. The ink is an input for HWR engine 22.

In step 104 the ink features are extracted. As mentioned hereinabove in FIG. 1, HWR engine 22 extracts the features of the ink and position information relating to the character that was input and stores them in database 20. This step will be further explained hereinbelow with reference to FIG. 9.

In step 106 the character recognition is performed from the features and the position information. As mentioned hereinabove in FIG. 1, HWR engine 22 performs recognition of the character that was input. This step will be further explained hereinbelow with reference to FIG. 10.

In step 108 the recognized character is output. As mentioned hereinabove in FIG. 1, controller 16 provides the result of the recognition process to output unit 18, which displays the recognized character.

Figure 9:
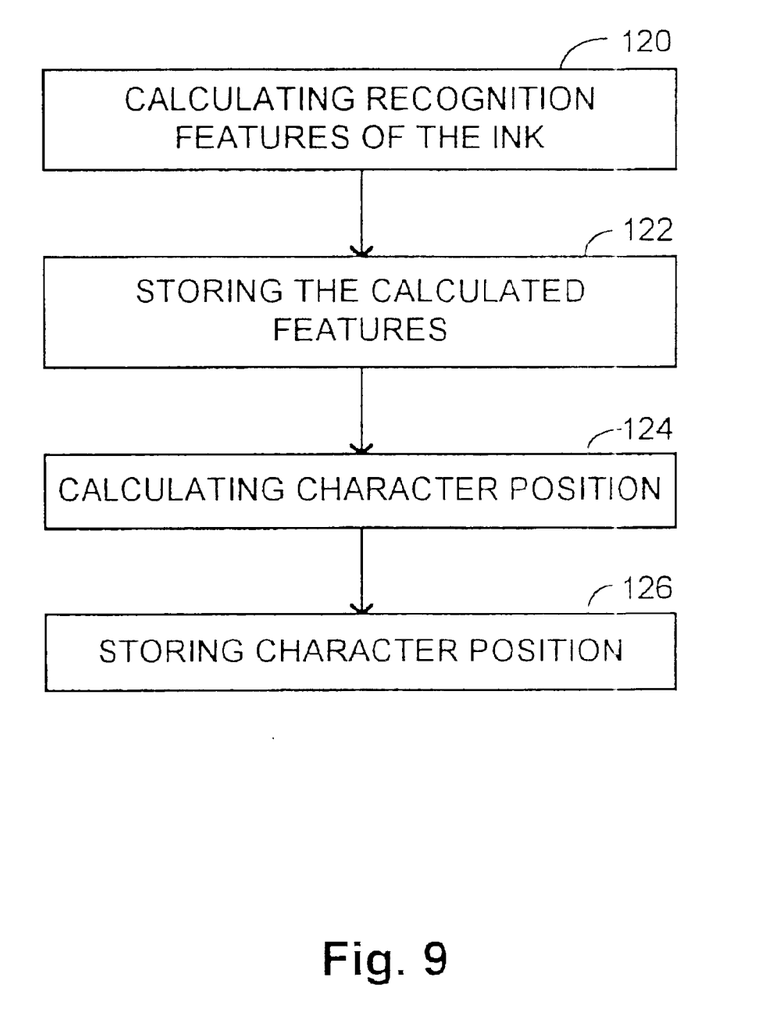
FIG. 9 is a schematic flowchart illustration of the steps for extracting the ink features from FIG. 8.

Reference is now made to FIG. 9, a schematic flowchart illustration of step 104 of FIG. 8.

In step 120, the recognition features of the ink are calculated by HWR engine 22 of FIG. 1. Any method known in the art can be used. If for example, the predetermined character set consists of four characters "a", "b", "g", and "9", then the result of feature recognition, in an embodiment of the present invention, is an M×N matrix where N is the number of the characters in the set (4 in our example) and M is the number of the features for each of the characters.

In step 122 the calculated recognition features are stored in database 20 by controller 16.

In step 124 the character position is calculated by HWR engine 22. For each character in the character set, there is an equation defined for calculating the character position, herein referred to as P_FTR. The result of the calculation is two numbers, which correspond to a point, i.e. with coordinates x and y, on the writing surface. An exemplary set of equations for the character position calculation can be written in the form:

$$P\_FTR_{``a"}=\{X_{min}/X_m, y_{max}/Y_m\}, \qquad (9)$$

$$P\_FTR_{``b"}=\{X_{max}/X_m, y_{max}/Y_m\}, \qquad (10)$$

$$P\_FTR_{``g"}=\{R_x/X_m, R_y/Y_m\}, \qquad (11)$$

$$P\_FTR_{``9"}=\{(X_{max}+X_{min})/(2*x), R_y/Y_m\}, \qquad (12)$$

where $x_{min}$ and $x_{max}$ are respectively, the minimal and maximal values of the x coordinate of the ink, $Y_{max}$ is the maximal value of the y coordinate of the ink, and $R_x$ and $R_y$ are respectively the value of the coordinate x and the value of the coordinate y of the center of gravity of the ink. Other equations are possible which may include $Y_{min}$ the minimal value of y.

HWR engine 22 calculates the character position corresponding to each character in the character set, based on the input ink (using the digitized coordinates provided by digitizer 14) and exemplary equations (9)–(12). If, for example, the input ink is the letter "g" as shown in FIG. 4 at the left, then equations (9)–(12) will yield the following values for character positions:

$$P\_FTR_{``a"}=\{0.1, 0.7\};$$

$$P\_FTR_{``b"}=\{0.2, 0.7\};$$

$$P\_FTR_{``g"}=\{0.16, 0.5\}; \text{ and}$$

$$P\_FTR_{``9"}=\{0.15, 0.5\}. \qquad (13)$$

In step 126 the calculated character positions are stored in database 20 by controller 16.

Figure 10:
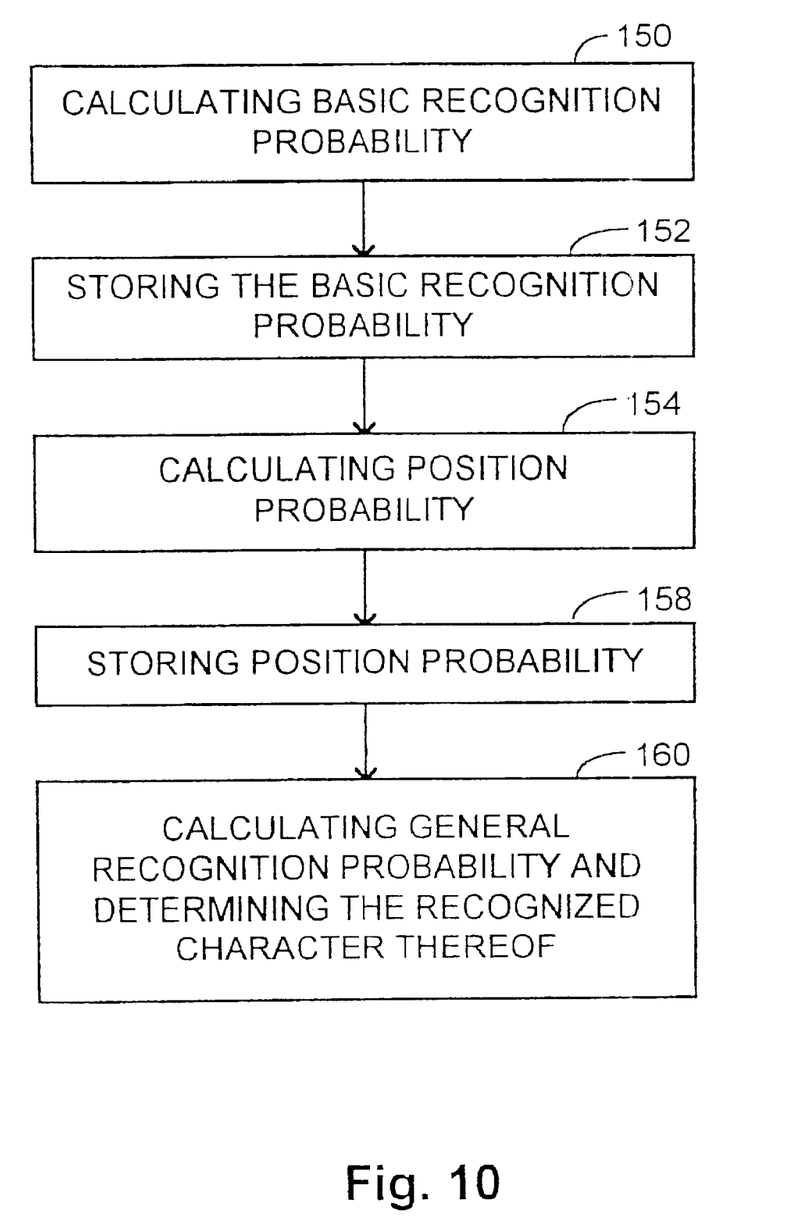
FIG. 10 is a schematic flowchart illustration of the steps for recognition of the input character from FIG. 8.

Reference is now made to FIG. 10, a schematic flowchart illustration of step 106 of FIG. 8.

In step 150, a primary recognition probability for the input ink is calculated. Controller 16 retrieves the calculated features of the ink from database 20 and provides them to HWR engine 22. HWR engine 22 calculates the primary recognition probability for the ink. Any method known in the art for recognition probability calculation can be used. The result of this calculation is a vector B_PROS having N components, where N is the number of characters in the character set. In the case of the character set mentioned above (a, b, g, and 9), B_PROB has four components with the following exemplary values:

$$B\_PROB_{``a"}=0.6$$

$$B\_PROB_{``b"}=0.4$$

$$B\_PROB_{``g"}=0.9$$

$$B\_PROB_{``9"}=0.9 \qquad (14)$$

In step 152, the calculated primary recognition probabilities are stored. Controller 16 stores the vector B_PROB in database 20.

In step 154, the ink position probability is calculated. Using the stored values of the vector P_FTR and the CDWF(x, y) for the respective characters, the ink position probability is calculated by HWR engine 22. For example, substituting the x values of $P\_FTR_{``a"}$, $P\_FTR_{``b"}$, $P\_FTR_{``g"}$, from (13) into equation (3), and the x value of P_FTR."g" from (13) into equation (4), gives the following values for position probability vector P_PROB:

P_PROB."a"=0.92,

P_PROB."b"=0.84,

P_PROB."g"=0.88, and

P_PROB."9"=0.32.

In step 158, the position probability values are stored by controller 16 in database 20.

In step 160, a general recognition probability is calculated. Controller 16 retrieves vectors B_PROB and P_PROB from database 20 and provides them to HWR engine 22. HWR engine 22 calculates the general recognition probability G_PROB. G_PROB is a vector having N components, each component corresponding to one of the characters in the character set. In accordance with a preferred embodiment of the present invention, the general recognition probability G-PROB can be calculated using the following equation:

$$G\_PROB_i = (B\_PROB_i * W_i) + (P\_PROB_i * (1-W_i)), \quad (15)$$

where $W_i$ is a weighting factor and i in our example may be any of "a", "b", "g", or "9".

HWR engine 22 further selects the component $G\_PROB_i$ with the maximal value and considers the character that corresponds to this component to be the input character.

If, for example, the values of $W_i$ are: $W_{"a"}=0.8$, $W_{"b"}=0.8$, $W_{"g"}=0.7$ and $W_{"9"}=0.75$, then the respective $G\_PROB_i$ values are:

G_PROB."a"=0.66, G_PROB."b"=0.5, G_PROB."g"=0.894, G_PROB."9"=0.762.

The value of G_PROB."g" is the maximal value; hence, the input character is "g".

It is noted that equations other than equation (15) can be used for calculating G_PROB.

It will be appreciated by persons skilled in the art that the present invention is not limited by what has been particularly shown and described herein above. Rather the scope of the invention is defined by the claims that is follow.

What is claimed is:

1. A method for recognizing input characters handwritten onto an input area of an input device, each point of the input area being represented by coordinate values, the method comprising the steps of:

receiving a signal representative of an input character, said signal including at least information about said coordinate values of said input character;

determining an input position representative of said input character using said information about said coordinate values; and recognizing said input character as one of a plurality of reference characters in a reference library, at least using recognition features and a weighting function of each of said plurality of reference characters in said reference library, and said input position, wherein said coordinate values comprise a first coordinate value and a second coordinate value and said weighting function is a linear function of at least one of: said first coordinate value and said second coordinate value.

2. A method for recognizing input characters handwritten onto an input area of an input device, each point of the input area being represented by coordinate values, the method comprising the steps of:

receiving a signal representative of an input character, said signal including at least information about said coordinate values of said input character;

determining an input position representative of said input character using said information about said coordinate values; and recognizing said input character as one of a plurality of reference characters in a reference library, at least using recognition features and a weighting finction of each of said plurality of reference characters in said reference library; and said input position, wherein said coordinate values comprise a first coordinate value and a second coordinate value and said weighting function is a non-linear function of at least one of: said first coordinate value and said second coordinate value.

3. A method for recognizing input characters handwritten onto an input area of an input device, each point of the input area being represented by coordinate values, the method comprising the steps of:

receiving a signal representative of an input character, said signal including at least information about said coordinate values of said input character;

determining an input position representative of said input character using said information about said coordinate values;

recognizing said input character as one of a plurality of reference characters in a reference library, at least using recognition features and a weighting finction of each of said plurality of reference characters in said reference library, and said input position wherein said step of recognizing further comprises the steps of:

extracting input recognition features of said input character;

comparing between said input recognition features and the recognition features of said reference characters and generating a primary recognition probability vector;

determining a position probability vector for said input character using said input position and said weighting function of each of said plurality of reference characters;

determining a general recognition probability vector for said input character using said primary recognition probability vector and said position probability vector; and selecting a reference character having the highest general recognition probability as the recognized character.

4. A method for distinguishing among handwritten characters, the method comprising the steps of:

receiving information about an input character said information including at least one input position;

having a library of reference characters each one of said reference characters having at least reference position information associated therewith; and recognizing said input character as one of said reference characters at least using said at least one input position and said reference position information, wherein said at least one input position comprises a first coordinate value and a second coordinate value, and wherein said reference position information is a linear function of at least one of: said first coordinate value and said second coordinate value.

5. A method for distinguishing among handwritten characters, the method comprising the steps of:
   receiving information about an input character said information including at least one input position;
   having a library of reference characters each one of said reference characters having at least reference position information associated therewith; and
   recognizing said input character as one of said reference characters at least using said at least one input position and said reference position information,
   wherein said at least one input position comprises a first coordinate value and a second coordinate value, and
   wherein said reference position information is a non-linear finction of at least one of: said first coordinate value and said second coordinate value.

6. A method for distinguishing among handwritten characters, the method comprising the steps of:
   receiving information about an input character said information including at least one input position;
   having a library of reference characters each one of said reference characters having at least reference position information associated therewith; and
   recognizing said input character as one of said reference characters at least using said at least one input position and said reference position information, wherein said reference position information comprises a probability function of position.

7. A method for distinguishing among handwritten characters, the method comprising the steps of:
   receiving information about an input character said information including at least one input position;
   having a library of reference characters each one of said reference characters having at least reference position information associated therewith; and
   recognizing said input character as one of said reference characters at least using said at least one input position and said reference position information wherein said step of recognizing comprises the steps of:
      extracting input features from said input character;
      generating a primary recognition probability using said input features and reference features of said reference characters;
      generating a position probability using said input position and said reference position information;
      generating a general probability for each of said reference characters using said primary recognition probability and said position probability; and
      selecting the reference character whose general probability is best according to a selection criteria.

8. A system for the recognition of input characters handwritten onto an input area of an input device, each point of the input area being represented by coordinate values, the system comprising:
   a unit for receiving a signal representative of an input character, said signal including at least information about said coordinate values of said input character;
   means for determining an input position representative of said input character using said information about said coordinate values; and
   a handwriting recognition unit for recognizing said input character as one of a plurality of reference characters in a reference library, at least using recognition features and a weighting finction of each of said plurality of reference characters in said reference library and said input position, wherein said coordinate values comprise a first coordinate value and a second coordinate value and said weighting function is a linear function of at least one of: said first coordinate value and said second coordinate value.

9. A system for the recognition of input characters handwritten onto an input area of an input device, each point of the input area being represented by coordinate values, the system comprising:
   a unit for receiving a signal representative of an input character, said signal including at least information about said coordinate values of said input character;
   means for determining an input position representative of said input character using said information about said coordinate values; and
   a handwriting recognition unit for recognizing said input character as one of a plurality of reference characters in a reference library, at least using recognition features and a weighting function of each of said plurality of reference characters in said reference library, and said input position, wherein said coordinate values comprise a first coordinate value and a second coordinate value and said weighting function is a non-linear function of at least one of: said first coordinate value and said second coordinate value.

10. A system for the recognition of input characters handwritten onto an input area of an input device, each point of the input area being represented by coordinate values, the system comprising:
   a unit for receiving a signal representative of an input character, said signal including at least information about said coordinate values of said input character;
   means for determining an input position representative of said input character using said information about said coordinate values; and
   a handwriting recognition unit for recognizing said input character as one of a plurality of reference characters in a reference library, at least using recognition features and a weighting function of each of said plurality of reference characters in said reference library, and said input position, wherein said handwriting recognition unit comprises:
      means for extracting input recognition features of said input character;
      means for comparing between said input recognition features and the recognition features of said reference characters and generating a primary recognition probability vector;
      means for determining a position probability vector for said input character using said input position and said weighting function of each of said plurality of reference characters;
      means for determining a general recognition probability vector for said input character using said primary recognition probability vector and said position probability vector; and
      means for selecting a reference character having the highest general recognition probability as the recognized character.

11. A system for distinguishing among handwritten characters the system comprising:
   a unit for receiving information about an input character said information including at least one input position;
   a library of reference characters each one of said reference characters having at least reference position information associated therewith; and a handwriting recognition unit for recognizing said input character as one of said reference characters at least using said at least one input position and said reference position information,
  wherein said at least one input position comprises a first coordinate value and a second coordinate value, and wherein said reference position information is a linear finction of at least one of: said first coordinate value and said second coordinate value.

12. A system for distinguishing among handwritten characters, the system comprising:
  a unit for receiving information about an input character said information including at least one input position;
  a library of reference characters each one of said reference characters having at least reference position information associated therewith; and
  a handwriting recognition unit for recouping said input character as one of said reference characters at least using said at least one input position and said reference position information,
    wherein said at least one input position comprises a first coordinate value and a second coordinate value, and wherein said reference position information is a non-linear function of at least one of: said first coordinate value and said second coordinate value.

13. A system for distinguishing among handwritten characters, the system comprising:
  a unit for receiving information about an input character said information including at least one input position;
  a library of reference characters each one of said reference characters having at least reference position information associated therewith; and
  a handwriting recognition unit for recognizing said input character as one of said reference characters at least using said at least one input position and said reference position information, wherein said reference position information comprises a probability finction of position.

14. A system for distinguishing among handwritten characters, the system comprising:
  a unit for receiving information about an input character said information including at least one input position;
  a library of reference characters each one of said reference characters having at least reference position information associated therewith; and
  a handwriting recognition unit for recognizing said input character as one of said reference characters at least using said at least one input position and said reference position information; wherein said handwriting recognition unit comprises:
    means for extracting input features from said input character;
    means for generating a primary recognition probability using said input features and reference features of said reference characters;
    means for generating a position probability using said input position and said reference position information;
    means for generating a general probability for each of said reference characters using said primary recognition probability and said position probability; and
    means for selecting the reference character whose general probability is best according to a selection criteria.

* * * * *